US008576992B2

(12) United States Patent
Samarasinghe

(10) Patent No.: US 8,576,992 B2
(45) Date of Patent: *Nov. 5, 2013

(54) MIXED PROTOCOL MULTI-MEDIA PROVIDER SYSTEM INCORPORATING A SESSION INITIATION PROTOCOL (SIP) BASED MEDIA SERVER ADAPTED TO OPERATE USING SIP MESSAGES WHICH ENCAPSULATE GR-1129 ADVANCED INTELLIGENCE NETWORK BASED INFORMATION

(75) Inventor: Harish Samarasinghe, Holmldel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,130

(22) Filed: Apr. 16, 2012

(65) Prior Publication Data

US 2012/0203883 A1 Aug. 9, 2012

Related U.S. Application Data

(63) Continuation of application No. 11/676,426, filed on Feb. 19, 2007, now Pat. No. 8,160,214, which is a continuation of application No. 10/304,614, filed on Nov. 26, 2002, now Pat. No. 7,180,984.

(51) Int. Cl.
*H04M 11/00* (2006.01)
(52) U.S. Cl.
USPC ..................... 379/88.13; 379/88.17
(58) Field of Classification Search
USPC .................... 379/88.13, 88.17, 788.13, 88.14
See application file for complete search history.

(56) References Cited

U.S. PATENT DOCUMENTS

| | | | |
|---|---|---|---|
| 5,884,262 A | 3/1999 | Wise et al. | |
| 5,915,001 A | 6/1999 | Uppaluru | |
| 6,018,765 A | 1/2000 | Durana et al. | |
| 6,512,818 B1 | 1/2003 | Donovan et al. | |
| 6,529,500 B1 * | 3/2003 | Pandharipande | 370/352 |
| 6,600,736 B1 | 7/2003 | Ball et al. | |
| 6,625,258 B1 * | 9/2003 | Ram et al. | 379/88.13 |
| 6,661,886 B1 * | 12/2003 | Huart et al. | 379/215.01 |
| 6,735,621 B1 | 5/2004 | Yoakum et al. | |
| 6,765,912 B1 | 7/2004 | Vuong | |
| 6,778,653 B1 | 8/2004 | Kallas et al. | |
| 6,798,767 B1 | 9/2004 | Alexander et al. | |
| 6,865,260 B1 * | 3/2005 | Meadows et al. | 379/88.22 |
| 6,888,930 B1 * | 5/2005 | Hartselle et al. | 379/88.22 |
| 6,947,528 B1 * | 9/2005 | Ko et al. | 379/88.17 |
| 6,985,564 B1 * | 1/2006 | Hersent | 379/88.17 |

(Continued)

*Primary Examiner* — Simon Sing

(57) ABSTRACT

A system and method for processing a plurality of requests for a plurality of multi-media services received at a Private Service Exchange (PSX) defined on the system from a plurality of IP-communication devices. The system includes a Network Gateway Controller (GSX) coupled to the PSX and to a media sever (MS). The PSX is coupled to at least one IP Service Control Point (IP-SCP), which is operative to process the plurality of requests for the plurality of multi-media services. The IP-SCP further selectively directs the requests to the media server, via the PSX and GSX. The media server operates to form a preliminary multi-media communication path with a calling communication device. The MS further operates to play a plurality of announcements to the calling communication device over the preliminary multi-media communication path, as well as to collect caller-entered data from the calling communication device over the preliminary multi-media communication path.

20 Claims, 3 Drawing Sheets

(56) References Cited

U.S. PATENT DOCUMENTS

| | | | |
|---|---|---|---|
| 6,985,576 B1 * | 1/2006 | Huck | 379/265.09 |
| 7,016,348 B2 * | 3/2006 | Laursen et al. | 370/389 |
| 7,035,252 B2 * | 4/2006 | Cave et al. | 370/356 |
| 7,127,400 B2 | 10/2006 | Koch | |
| 7,180,984 B1 | 2/2007 | Samarasinghe | |
| 7,298,830 B2 * | 11/2007 | Guedalia et al. | 379/88.17 |
| 8,160,214 B1 | 4/2012 | Samarasinghe | |

* cited by examiner

MIXED PROTOCOL MULTI-MEDIA PROVIDER SYSTEM INCORPORATING A SESSION INITIATION PROTOCOL (SIP) BASED MEDIA SERVER ADAPTED TO OPERATE USING SIP MESSAGES WHICH ENCAPSULATE GR-1129 ADVANCED INTELLIGENCE NETWORK BASED INFORMATION

CROSS-REFERENCES TO RELATED APPLICATIONS

This application is a continuation of U.S. patent application Ser. No. 11/676,426, filed Feb. 19, 2007 now U.S. Pat. No. 8,160,214, which is currently allowed and is a continuation of U.S. patent application Ser. No. 10/304,614 filed Nov. 26, 2002, now U.S. Pat. No. 7,180,984, all of which are herein incorporated by reference in their entirety.

FIELD OF THE INVENTION

The present invention relates generally to a system and method for processing a plurality of requests for a plurality of multi-media services and, more specifically, to a system and method for processing a plurality of requests for a plurality of multi-media services by selectively directing the requests to at least one media server for forming a preliminary multi-media communication path between the media server and a calling communication device to permit the media server to play announcements to and collect caller-entered data from the calling communication device.

BACKGROUND

Conventional methods for communicating information over Internet-based multi-media service provider systems, such as systems and services provided by AT&T, can require several Internet Protocols ("IP"), which are used for transporting media and/or control signal information over the multi-media service provider systems. Typically, a mixture of call signaling protocols, such as H.323, Media Gateway Control Protocol (MGCP), Hyper Text Transfer Protocol (HTTP) and proprietary protocols, are used for communicating the signal information between various components of the multi-media service provider systems.

Presently, Session Initiation Protocol (SIP) is becoming an increasingly popular protocol for transporting both standard and non-standard information in a common framework over Wide Area Networks (WANs). However, Local Area Networks (LANs) hosted by multi-media service providers continue to employ a mixture of call signaling protocols, as well as other proprietary protocols, which may be unique to each multi-media communication service provider system. However, each multi-media communication service provider system operating on a LAN is required to interface with SIP in order to communicate information over the WAN to SIP-enabled communication devices.

Furthermore, as multi-media communication service provider systems continue to offer additional services, there is a need to support preliminary multi-media communications with customers operating at the various SIP-enabled communication devices to collect caller-entered data and to process the caller-entered data to determine if the customer is authorized to receive a requested service.

Therefore, an unsolved need remains for a multi-media communication service provider system, which employs a mixture of call signaling protocols, that is adapted to provide a multi-media interface directly compatible with SIP for supporting preliminary multi-media communications between the multi-media communication service provider system and a number of SIP-enabled communication devices operating on the WAN.

SUMMARY OF THE INVENTION

In accordance with principles of the present invention, a system and method for processing a plurality of requests for a plurality of multi-media services received at a multi-media services provider system is set forth. The system processes the plurality of requests for the plurality of multi-media services by selectively directing the requests to at least one predetermined media server, which is located on the multi-media services provider system, for processing the requests based on predetermined attributes of the requests.

In one aspect of the present invention, the multi-media services provider system includes a gateway controller that is adapted to receive at least one request message in a first format for at least one multi-media service. The gateway controller is further adapted to translate the at least one request message in the first format into at least one request message in a second format. An IP-compatible switching device (e.g., a PSX) coupled to the gateway controller is adapted to receive the at least one request message in the second format and to translate the at least one request message in the second format into at least one request message in a third format. The system further includes a processor coupled to the switching device adapted to receive the at least one request message in the third format and to process the at least one request message in the third format to generate a media server instruction message in the third format. The switching device receives and translates the media server instruction message in the third format to a media server instruction message in the second format. The gateway controller receives and translates the media server instruction message in the second format to a media server instruction message in the first format. A media server, which is coupled to the gateway controller, receives and responds to the media server instruction message in the first format by forming a multi-media communication path with at least one communication device.

In another aspect of the present invention, the method for processing the plurality of requests for the plurality of multi-media services received at the multi-media services provider system includes receiving at least one request message in a first format for at least one multi-media service at a gateway controller located on the multi-media services provider system. The gateway controller translates the at least one request message in the first format into at least one request message in a second format. An IP-compatible switching device located on the multi-media services provider system receives the at least one request message in the second format and translates the at least one request message in the second format into at least one request message in a third format. A processor located on the multi-media services provider system receives the at least one request message in the third format and processes the at least one request message in the third format for generating a media server instruction message in the third format.

The IP-compatible switching device receives the media server instruction message in the third format and processes the media server instruction message in the third format to translate the media server instruction message into the second format. The gateway controller receives the media server instruction message in the second format. Further, the gateway controller is operative for mapping predetermined attributes of the media server instruction message in the second format into a media server instruction message in the first format. Thereafter, the gateway controller communicates the media server instruction message in the first format to a media server located on the multi-media services provider system. The media server responds to receipt of the media server instruction message in the first format by forming a multi-media communication path with at least one SIP-enabled communication device.

In another aspect of the invention, the method further includes playing a predetermined announcement to the at least one communication device over the multi-media communication path. In response to the predetermined announcement, the at least one communication device can communicate caller-entered data to the media server. After receiving the caller-entered data, the media server can process the caller-entered data to generate a validation message in the first format, which includes the caller-entered data. The media server can communicate the validation message in the first format to the gateway controller. The gateway controller processes the validation message in the first format to generate a validation message in the second format and including the caller-entered data. The switching device receives and processes the validation message in the second format to generate a validation message in the third format. The processor receives and processes the validation message in the third format to validate the caller-entered data.

Depending on the outcome of the processing of the validation message in the third format by the processor, the processor can determine or declare the caller-entered data as having any one of a number of predetermined states. For example, the processor can declare the status of the caller-entered data as valid and connect. In this instance, the gateway controller is controlled to form a multi-media communication path between the at least one communication device and at least one other communication device.

In an exemplary embodiment, the processor can declare the caller-entered data as invalid, which requires a caller at the at least one communication device to be re-prompted to re-enter the caller-entered data. In this instance, the media server is controlled to re-play the predetermined announcement to the at least one communication device over the multi-media communication path. Further, the media server can receive the caller-entered data in response to the re-played predetermined announcement played to the at least one communication device. Thereafter, the above-described process of validating the caller-entered data at the processor may be repeated.

In yet another embodiment, the processor can declare the caller-entered data as invalid, which requires the at least one communication device to be disconnected from the system. In this instance, the media server is controlled to play a termination announcement to the at least one communication device over the multi-media communication path. Further, the media server may be controlled to disconnect the multi-media communication path formed between the media server and the at least one communication device.

In a further aspect of the invention, translating the at least one request message in the first format into the at least one request message in the second format, as described above, includes translating the at least one request message from a SIP INVITE format to a Diameter-Plus format. In another aspect, translating the at least one request message in the second format into the at least one request message in the third format, as also described above, includes translating the at least one request message from a Diameter-Plus format to an Advanced-Intelligent-Network Transactions Capabilities format. In a similar aspect, generating the media server instruction message in the third format includes generating the media server instruction message in the Advanced-Intelligent-Network Transactions Capabilities format.

BRIEF DESCRIPTION OF THE DRAWING

The foregoing and other objects of this invention, the various features thereof, as well as the invention itself, can be more fully understood from the following description, when read together with the accompanying drawings in which.

DETAILED DESCRIPTION OF THE INVENTION

Figure 1:
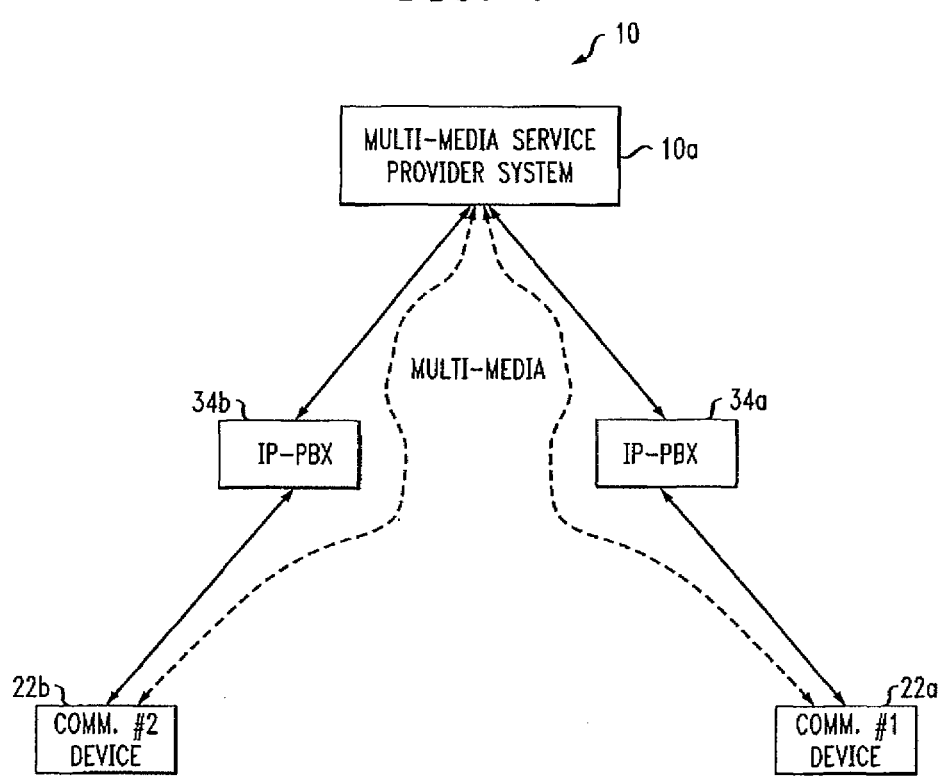
FIG. 1 is an exemplary high-level schematic block diagram of a system for providing multi-media communications between a plurality of communication devices according to the present invention.

FIG. 1 shows one embodiment of a communication network 10 for providing multi-media communications between at least first 22a and second 22b communication devices of a plurality of communication devices, in accordance with the present invention. The communication network 10 includes a multi-media provider system 10a, which is operative to provide a plurality of multi-media services to the first 22a and second 22b communication devices, via respective first 34a and second 34b IP-Private Branch Exchanges (hereinafter referred to as "IP-PBXs"). It should be understood that the multi-media services provider system 10a is additionally operative to provide a plurality of multi-media services to a plurality of other communication devices not specifically shown herein.

Figure 2:
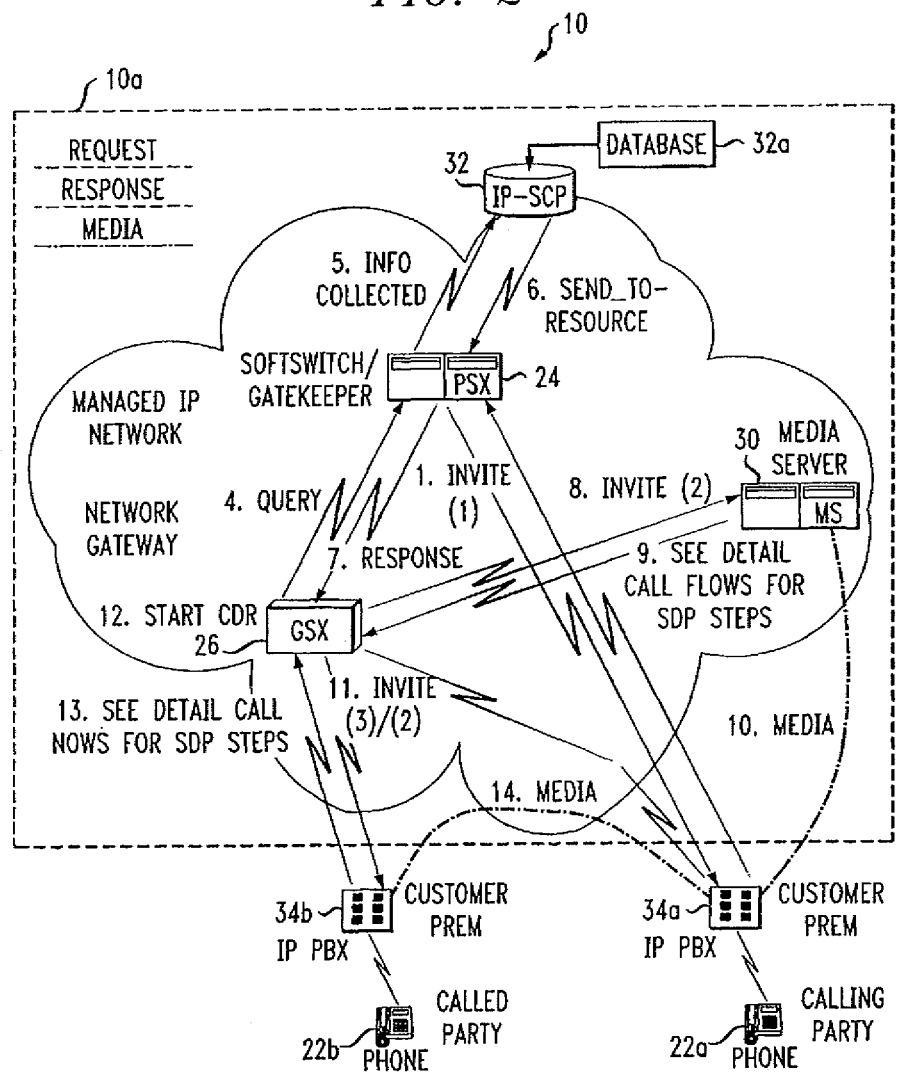
FIG. 2 is an expanded schematic block diagram of the system shown in FIG. 1.

Referring to FIG. 2, in the exemplary embodiment, the multi-media services provider system 10a includes a centrally located Softswitch/Gatekeeper or Private Service Exchange 24 (hereinafter referred to as "PSX"), at least one Media Server ("MS") 30, at least one Internet-Protocol Service Control Point 32 (hereinafter referred to as "IP-SCP") and at least one Network Gateway 26 (hereinafter "GSX") The PSX 24 is coupled to the at least one IP-SCP 32 and to the GSX 26. In the exemplary embodiment, the PSX 24 is further coupled to the first IP-PBX 34a. It should be understood that in other embodiments, not specifically shown herein, the PSX 24 can be coupled to the second IP-PBX 34b, as well as to a plurality of other IP-PBXs (not shown). In the exemplary embodiment, the GSX 26 is coupled to both the first 34a and second 34b IP-PBXs and to MS 30.

In the exemplary embodiment, the first IP-PBX 34a is coupled to the first communication device 22a. Further, the second IP-PBX 34b is similarly coupled to the second communication device 22b.

The PSX 24, for example, can be provided by Sonus Networks of Westford, Mass. The PSX 24 is adapted to operate using an Advanced-Intelligent-Network Transactions Capabilities protocol or format (i.e., "AIN TCAP format," which is referred to hereinafter as "TCAP") over a Transport Adapter Layer Interface (hereinafter referred to as "TALI"), which is employed as the signaling interface between the PSX 24 and the IP-SCP 32. The information received at the PSX 24, via a Query message received from the GSX 26, is mapped to a TCAP Info_Collected message and passed to the IP-SCP 32 for feature processing. Depending on the outcome of the IP-SCP 32 processing, the IP-SCP 32 may send one or more predefined instructions to the PSX 24 via one or more TCAP messages, such as an Analyze_Route message or a Send_To_Resource message, which will be described in further detail below.

In addition, the PSX 24 acts as a Session Initiation Protocol (SIP) redirect or proxy server because the PSX 24 can receive a plurality of SIP INVITE messages (hereinafter referred to as "INVITE messages") and redirect the plurality of INVITE messages to the GSX 26, via the IP-PBX 34*a*, for example. The PSX 24 also supports a set of TCAP triggers that filter Query messages provided to the PSX 24 to permit the PSX 24 to initiate TCAP queries to the IP-SCP 32, when the appropriate conditions are met. The TCAP triggers at the PSX 24 adhere to the triggers defined at the Service Switching Point (SSP) of the AIN Call model. The PSX 24 may have triggers activated by specific digit strings of the destination address. The PSX 24 may also set triggers based on the origination address, such as the charge number. Also before a call encounters a trigger, the PSX 24 may provide per-query screening on the various fields in Query message.

The PSX 24 receives a TCAP message in response to querying the IP-SCP 32. For example, if the IP-SCP 32 determines that caller interaction is required to process the call, the IP-SCP 32 provides a Send_To_Resource message (e.g., media server instruction message in the TCAP format) to the PSX 24. Upon receiving the Send_To_Resource message, the PSX 24 generates a Response message in a Diamond Plus Protocol (DPP) with the content it received in the Send_To_Resource message, such as an announcement resource type and announcement ID to be played. Assuming that the Send_To_Resource message does not contain a disconnect flag indicating a terminating announcement, the PSX 24 keeps the TCAP transaction with the IP-SCP 32 open. This allows the PSX 24 to map TCAP messages to/from the IP-SCP 32 to the DPP messages to/from the GSX 26.

If the interaction with the caller requires multiple interactions, and therefore multiple TCAP transactions are required between the PSX 24 and IP-SCP 32, the IP-SCP 32 sends a Call_Info_To_Resource message to the PSX 24 (e.g., instead of the Send_To_Resource message). The IP-SCP 32 may also provide the Call_Info_To_Resource message to the PSX 24 if the IP-SCP 32 determines that the user-entered data is invalid and the user must be re-prompted.

The IP-SCP 32 can also provide a plurality of other TCAP messages depending on particular circumstances related to the call. For example, the IP-SCP 32 may provide a Cancel_Resource_Event message to the PSX 24 if the IP-SCP 32 determines that no more interaction with the caller is required and the MS 30 should disconnect the caller at the first communication device 22*a*. Further, the IP-SCP 32 may provide a Resource_Clear message to the PSX 24 if the IP-SCP 32 determines that the MS 30 has completed playing a terminating announcement and the MS 30 has torn down the connection to the caller at the first communication device 22*a*, which instructs the GSX 26 to disconnect the call. In addition, the IP-SCP 32 may provide an Analyze_Route message to the PSX 24 if the IP-SCP 32 determines that it needs to pass routing and recording instructions to the PSX 24.

In the exemplary embodiment, the GSX 26 can be provided by Sonus Networks of Westford, Mass. In one embodiment, the GSX 26 uses SIP as the signaling protocol for interfacing with the MS 30, as well as for interfacing with the first 34*a* and second 34*b* IP-PBXs. Furthermore, the GSX 26 uses DPP as the signaling protocol for interfacing with the PSX 24. Thus, the GSX 26 supports the SIP stack in addition to supporting the DPP stack. Whenever the GSX 26 receives a Response message from the PSX 24 containing the IP address of the MS 30, the GSX 26 formulates an INVITE message with the information received from the PSX 24 and forwards the INVITE message to the MS 30, which will be described in further detail below.

In the exemplary embodiment, the GSX 26 may be thought of as a SIP Back-to-Back User Agent (B2BUA) because it generates SIP messages as well as receives requests from SIP endpoints, such as the SIP-enabled first 34*a* and second 34*b* IP-PBXs, and either processes the requests itself or forwards the requests to another SIP device (not shown). The exemplary multi-media provider system 10*a*, as described herein, uses the GSX 26 to maintain call state information and to support third party call control. It should be understood that the multi-media provider system 10*a* is scalable and can include a plurality of GSXs (not shown), which communicate with each other using SIP.

During operation of the GSX 26, for example, upon receipt of a first INVITE message initiated by a first communication device 22*a*, the GSX 26 may map relevant information, such as a Called Party number and a Calling Party number, from the first INVITE message to a Query message in the DPP format, which is sent to the PSX 24. In response to sending the Query message to the PSX 24, the PSX 24 may provide a Response message in the DPP format back to the GSX 26. Upon receipt of the Response message, and if the Response message contains an IP address of the MS 30, the GSX 26 generates a second INVITE message, which is forwarded to the MS 30 for establishing a session between the PSX 24 and the MS 30, via the GSX 26. The GSX 26 uses the routing addresses returned by the PSX 24 in the Send_To_Resource message to connect to the MS 30. The GSX 26 populates the URI and the "To" field of the second INVITE message with the IP address of the MS 30 to connect. The PSX 24 may send multiple addresses in the Send_To_Resource message, so that the GSX 26 may attempt to connect to multiple other Media Servers (not shown) in case the MS 30 cannot be reached or is unable to process the second INVITE message.

When the GSX 26 receives a Response message from the PSX 24 as a result of a TCAP Send_To_Resource message provided to the PSX 24 by the IP-SCP 32, the GSX 26 generates the second INVITE message with the content it received in the Response message, such as an announcement resource type and an announcement ID to be played. In the exemplary embodiment, a body portion of the second INVITE message includes GR-1129 AIN message set information, which was initially received in the Response message at the GSX 26. The AIN GR-1129 message set information provides intelligent peripheral with interactive voice response capability. Under instructions from the IP-SCP 32, the intelligent peripheral communicates with the caller at the first communication device 22*a* through DTMF tones, digitized speech, and speech recognition. The GSX 26 sends the second INVITE message with the SDP (Session Description Protocol) information of the first INVITE message because the media path needs to be established between the caller and the MS 30.

In response to the second INVITE message, the GSX 26 receives one or more instruction messages from the MS 30 instructing the GSX 26 to either terminate the SIP session to the MS 30 or to map information provided in a SIP INFO message to a Query message (DPP format), which is to be sent from the GSX 26 to the PSX 24. For example, if the GSX 26 receives an INFO message containing caller-entered data or a disconnect message, the GSX 26 can map the contents of the INFO message to the appropriate Query message parameters, which message is sent to the PSX 24. The PSX 24 maps the caller-entered data to the appropriate TCAP message and sends it to the IP-SCP 32 for further processing.

In the exemplary embodiment, the IP-SCP 32 can include a conventional computer server, such as an "NT-Server," which can be provided by Microsoft of Richmond, Wash. or a "Unix Solaris Server," which can be provided by Sun Micro Systems of Palo Alto, Calif. The IP-SCPs 32 can be programmed with conventional Web-page interface software such as: "Visual Basic," "Java," "JavaScript," "HTML/DHTML," "C++," "J+," "Perl," or "Perlscript," and "ASP." The IP-SCPs 32 can further be programmed with an operating system, Web server software and Web Application software, such as an e-commerce application and computer network interface software. In addition, the IP-SCP 32 can be programmed with multi-media service software adapted to provide a plurality of multi-media services, as is known, such as 115DN telecommunication service, "Click-to-Dial," Video Conferencing," "Virtual Private Networks," and "Toll-Free Calling or 800-Service."

The IP-SCP 32 can be further coupled to a database 32a, which contains a service intelligence layer adapted for providing the plurality of multi-media services described above. The intelligence layer may include customer logic and data, as well as common logic and data that is used by communication devices 22a, 22b, as well as a plurality of other communication devices not specifically shown in FIG. 2.

The first 22a and second 22b communication devices can include a plurality of SIP-enabled devices, such as telephones, personal computers and IP-Private Branch Exchanges ("IP-PBXs"). In addition, the first 22a and second 22b communication devices can include a plurality of SIP-enabled wireless devices, such as cellular telephones, pagers and personal digital assistants ("PDAs").

The MS 30, in the exemplary embodiment, is operative to provide a plurality of predetermined announcements to the communication devices 22a, 22b and to collect information from the communication devices 22a, 22b (e.g., caller-entered data). For example, if the caller is required to enter digits or a phrase for a Call Prompter service or SDN (Software Defined Network) service, the MS 30 will play the announcement prompting the caller to enter the required information. The MS 30 also collects the information entered by the caller. The MS 30 plays the announcements to the caller based on the instructions and announcement ID provided in the second INVITE message. In one embodiment, the announcements can include "Service Terminating" announcements or announcements for the caller to enter an authorization code, account code, or "call-prompter" digits.

When the MS 30 receives the second INVITE message from the GSX 26, the MS 30 accesses predetermined resources, such as announcement frames, voice recognition frames and/or Dual Tone Multi-Frequency (DTMF) receivers for establishing a SIP session with the GSX 26 (e.g., media path). Once the media path has been established between the caller operating from the first communication device 22a, for example, the MS 30 plays the appropriate announcement and collects the necessary caller information from the first communication device 22a, under the control of the GSX 26. After the MS 30 collects caller information, the MS 30 passes the caller information to the IP-SCP 32, via the GSX 26 and PSX 24, for validation and to receive further instructions from the IP-SCP 32 for processing the call.

Using SIP Third-Party Call Control capability, the GSX 26 establishes a media path between the caller at the first communication device 22a, for example, and the MS 30. The MS 30 plays the appropriate announcements and collects the necessary caller information. After the MS 30 collects caller-entered data, it passes the caller-entered data in an INFO message to the GSX 26. The GSX 26 maps the caller-entered data included in the INFO message to a Query message, which is forwarded to the PSX 24. Upon receipt of this Query message containing the caller-entered data, the PSX 24 maps the caller-entered data from the Query message to a TCAP message, which is sent to the IP-SCP 32 for validation.

Figure 3:
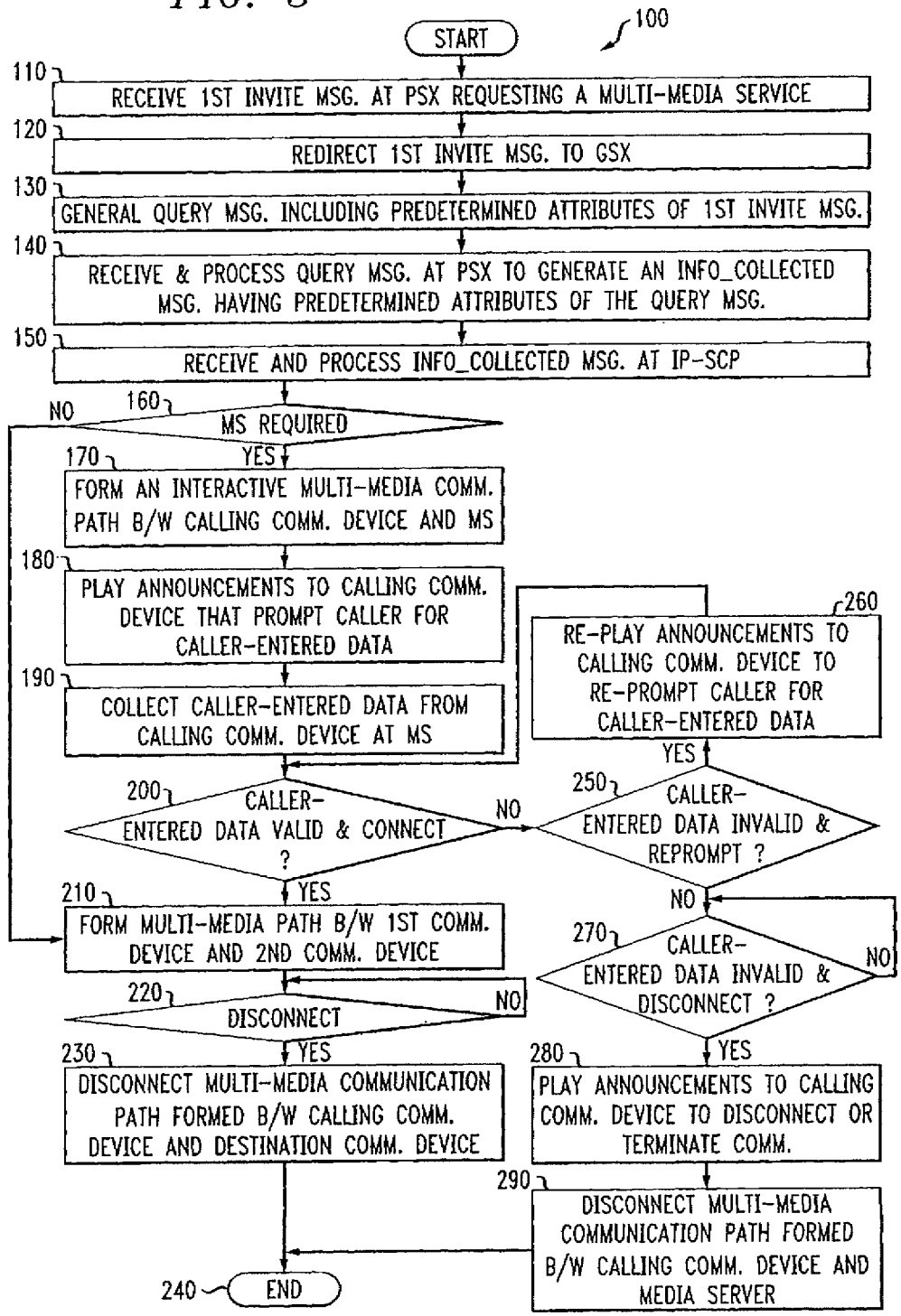
FIG. 3 is a high-level flow chart illustrating process steps executable on the system of FIG. 2.

Referring now to FIG. 3, an exemplary call flow diagram is shown for executing the method 100 on the communication network 10 of FIG. 2 to provide multi-media services between the first 22a and second 22b communication devices, in accordance with the present invention. The call flow described in the exemplary call flow diagram provides a generic call flow in the communication network 10 with several different protocols employed at various locations of the multi-media provider system 10a, where generally one of the communication devices 22a, for example, initiates a call by sending a first INVITE message to the PSX via IP-PBX 34a. Generally, the PSX 24 redirects the call by redirecting the first INVITE message to the GSX 26 with a SIP "302 Moved Temporary" message. This approach may be taken because the multi-media provider system 10a requires all calls to go through the GSX 26 prior to arriving at the IP-SCP 32 for feature processing because the GSX performs the B2BUA function and provides third party call control capability to connect call legs. Upon receipt of the first INVITE message at the GSX 26, the GSX 26 maps all the relevant information from a "To:" header, "From:" header and any other parameters into appropriate fields of the Query message (e.g., DPP format). Thereafter, the GSX 26 sends the Query message containing the relevant information to the PSX 24. If the call meets the appropriate conditions, the PSX 24 launches a TCAP query to the IP-SCP 32 for feature processing of the call. If the IP-SCP 32 determines that resources of the MS 30 are required to process the call, the IP-SCP 32 will provide instructions to the GSX 26 to couple the MS 30 to the first communication device 22a, via the PSX 24, as described in detail below.

The method commences, at step 110, by the PSX 24 receiving a request for a multi-media service from a caller operating at a calling or first communication device 22a, for example. More specifically, the caller operating the first communication device 22a generates a first INVITE message by dialing the number for the destination location (e.g., the second communication device 22b). The call arrives at the PSX with a Called Party Number and other information contained in the first INVITE message. A user-agent parameter of the first INVITE message may include "user=phone." In another example, the user-agent parameter of the first INVITE message may include SIP:+732.420.4699@att.com; user=phone SIP/2.0. The user-agent parameter set to "user=phone" distinguishes that the Request-URI address is a telephone number (called party number) rather than a user name.

At step 120, upon receipt of the first INVITE message, the PSX 24 redirects the first INVITE message with a SIP "302 Moved Temporary" message to the appropriate GSX 26. Upon receiving the first INVITE message at the GSX 26, the GSX 26 sends a 100 Trying message to the first communication device 22a. At step 130, the GSX 26 further maps the Called Party number, Calling Party number and any other relevant information into the appropriate fields of a Query message and sends the Query message to the PSX 24.

At step 140, the PSX 24 receives and processes the Query message by performing a pre-query screening on the information contained in the "To" header. Screening may be provisioned in the PSX 24 that will allow the PSX 24 to block calls such as 0+, 0−, or N11 rather than query the IP-SCP 32 for those calls. If the call meets the appropriate TCAP trigger criteria, the PSX 24 populates the information it received in the Query message into the TCAP Info_Collected message, such as the collected address parameter. If the number is 10 digits, then the NPT=Integrated Service Digital Network (ISDN) and the NoN=National, where NPT is defined herein as a Numbering Plan Type and NoN is defined herein as a Nature of Number. Further, if the prefix is 011, then the NoN=International and the NPT=ISDN. Thereafter, the PSX 24 sends the Info_Collected message to the IP-SCP 32. In an embodiment, the Info_Collected message may include the following information:

Package Type=Query with Permission to Release
        Component Type=Invoke(Last)
        Operation=infoCollected
        Parameters
           ChargeNumber
           CallingPartyID
           Carrier
           CollectedAddressInfo Specifications on the Info_Collected message information can be obtained at Telcordia GR-1129-CORE, AINGR: Switch Service Control Point (SCP)/Adjunct interface—[November 2000], the subject matter of which is herein incorporated by reference.

[At step 150, upon receipt of the Info_Collected message at the IP-SCP 32, the IP-SCP 32 processes the Info_Collected message by executing the appropriate customer logic. The customer logic applies appropriate screening and feature processing for the call. In the exemplary call flow, the IP-SCP 32 determines that caller interaction is necessary to process the call based on the caller's customer logic defined in the IP-SCP 32. The customer logic instructs the IP-SCP 32 to play an announcement and collect digits. Thus, at step 160, the IP-SCP 32 determines that employment of the MS 30 is required to process the call.

At step 170, the IP-SCP 32 executes a process for forming an interactive multi-media communication path between the calling or first communication device 22*a* and the MS 30. The process includes the IP-SCP 32 returning a Send_To_Resource Message (e.g., a media server instruction message) to the PSX 24. In an embodiment, the Send_To_Resource Message (e.g., GR-1129 AIN message set information) may include the following information:

Package Type=Conversation with Permission to Release
        Component Type=Invoke(Last)
        Operation=SendToResource
        Parameters
           ResourceType=FlexParameterBlock
           StrParameter Block=FlexParameterBlock
           IPResourceType=PlayAnnouncements & Collect-Digits
           IPStrParameterBlock=AnnouncementDigitBlock
           Destination Address=MS IP address
        Component Type=Invoke(last)
        Operation=Furnish_AMA Specifications on the Send_To_Resource Message information can be obtained at Telcordia GR-1129-CORE, AINGR: Switch Service Control Point (SCP)/Adjunct interface—[November 2000], the subject matter of which is herein incorporated by reference.

The IP-SCP 32 leaves open the transaction while awaiting a response from the PSX 24 to the Send_To_Resource message. In the exemplary embodiment, the IP-SCP 32 starts a timer and will close the transaction upon the timer's expiration if the IP-SCP does not first receive the response in the given time frame. If the IP-SCP 32 receives a response after the timer expires, the IP-SCP 32 ignores the message and takes no further action.

Upon receiving the Send_To_Resource message from the IP-SCP 32, the PSX 24 maps the relevant information received in the Send_To_Resource message into a Response message in the DPP format. Thereafter, the PSX 24 sends the Response message to the GSX 26. After receiving the Response message at the GSX 26, the GSX 26 generates a second INVITE message having an IP destination address associated with the MS 30. In the exemplary embodiment, the GSX 26 populates the message body of the second INVITE message with information such as: ResourceType=FlexParameterBlock and StrParameter Block=FlexParameterBlock, which was previously included in the Send_To_Resource message generated by the IP-SCP 32.

In another embodiment, the GSX 26 further populates the message body of the second INVITE message with some of the following information: "To" field containing the IP address of the MS 30; "From" field containing the IP address of the PSX 24; SDP of the first INVITE message mapped to the SDP of the second INVITE message; and instructions to play the announcement associated with the given announcement ID. In the exemplary embodiment, the message body portion of the second INVITE message also includes GR-1129 AIN message set information, which was initially received in the Response message at the GSX 26. Since the GSX 26 maintains the call state, the GSX 26 inserts a Record-Route header into the second INVITE message to ensure that all subsequent messages by either party (e.g., the MS 30 or the first communication device 22*a*) are sent, via the GSX 26. The GSX 26 also creates a Call Detail Record (CDR) for the call. In an embodiment, the GR1129 AIN message set information can be included in the second INVITE message, as shown below under MIME Media Subtype Name GR-1 129 in the second message body part:

INVITE sip:7324201000@msl.att.com SIP/2.0
    Via: SIP/2.0/UDP aft.com:5060
    From:sip:7324204699@att.com
    To: <sip:7324201000@att.com>
    Call-ID: c3904563-3119a-2995c 2e322238@att.com
    CSeq: 100 INVITE
    Content-Type: multipart/mixed; boundary="advanced-features"
        advanced-features
    Content-Type: application/sdp
        advanced-features
    Content-Type: application/GR-1129
    09 2f3c 11 3a 77 4a 9e[1]
        advanced-features The MS 30 receives and responds to receipt of the second INVITE message by returning a 183 Session Progress to the GSX 26, which includes SDP information associated with the MS 30. Upon receiving the 183 Session Progress, the GSX 26 sends a 183 Session Progress message to the caller operating at the first communication device 22*a* with the SDP information that the GSX 26 received from the MS 30. The first communication device 22*a* acknowledges the 183 Session Progress message with a Provisional Response Acknowledgement (PRACK) message, which is communicated to the GSX 26. Upon receiving the PRACK message at the GSX 26, the GSX 26 sends another PRACK message to the MS 30. Thereafter, the MS 30 returns a 200 OK message to the calling party at the first communication device 22*a*, via the GSX 26. At this point, the first communication device 22*a* (e.g., calling device) and the MS 30 communicate with each other for resource reservation using Resource Reservation Protocol-Traffic Engineering protocol (RSVP-TE).

After resource reservation, as described above, the calling party operating at the first communication device 22a sends a COMET message to the MS 30 confirming success. In response to receipt of the COMET message at the MS 30, the MS 30 sends a 200 OK message to the calling party at the first communication device 22a, via the GSX 26. Further, the MS 30 sends a 180 Ringing message to the calling party at the first communication device 22a, via the GSX 26. The calling party at the first communication device 22a sends a PRACK message to the called party at the second communication device 22b, via the GSX 26, in response to the 180 Ringing message. The MS 30 sends a 200 OK to the calling party at the first communication device 22a, via the GSX 26, in response to the PRACK message.

At this point, the MS 30 sends a 200 OK message to the GSX 26 in response to receipt of the second INVITE message, as previously described above. Upon receipt of the 200 OK message at the GSX 26, the GSX 26 sends a 200 OK message to the calling party operating at the first communication device 22a in response to receipt of the first INVITE message provided by the first communication device 22a, as described above. Thereafter, the calling party at the first communication device 22a sends an ACK message to the called party at the second communication device 22b. At this instant, a call leg is formed between the calling party at the first communication device 22a and the GSX 26, and a call leg is formed between the GSX 26 and the MS 30. Furthermore, a multi-media session is formed directly between the calling party at the first communication device 22a and the MS 30 (i.e., the media stream, not via the GSX).

At steps 180 and 190, the MS 30 can now play announcements directly to the calling party at first communication device 22a based on the announcement ID and collect the caller-entered data from the calling party (e.g., an authorization code). The MS 30 formats the digits of the caller-entered data received from the first communication device 22a and generates an INFO message including the formatted user-entered data. In an embodiment, the INFO message is defined as a "validation message," which includes the caller-entered data that is ultimately received and processed at the IP-SCP 32 to determine whether the caller-entered data contained therein is valid, as described in further detail below.

The MS 30 forwards the INFO message to the GSX 26 along with other appropriate information in the message body of the INFO message. Upon receiving the INFO message, the GSX 26 maps the information from the INFO message to a Query message and sends the Query message to the PSX 24. The PSX 24 maps the information from the Query message to a Call_Info_From_Resource message in the TCAP format, which is subsequently sent to the IP-SCP 32 for validation and/or processing. In the exemplary embodiment, the Call_Info_From_Resource message can include the following information:

Package Type=Conversation with Permission to Release
   Component Type=Invoke(Last)
   Operation=CallInfoFromResource
   Parameters
     ResourceType=IPReturnBlock
     IPCollectedDigits Specifications on the Call_Info_From_Resource message information can be obtained at Telcordia GR-1129-CORE, AINGR: Switch Service Control Point (SCP)/Adjunct interface—[November 2000], the subject matter of which is herein incorporated by reference.

At step 200, the IP-SCP 32 receives the Call_Info_From_Resource with the caller-entered data and processes the caller-entered data to determine whether the caller-entered data is valid. If the IP-SCP 32 determines that the caller-entered data is valid, the method 100 includes forming a multi-media communication path between the calling or first communication device 22a and the called or second communication device 22b at step 210.

In order to for the multi-media communication path between the calling or first communication device 22a and the called or second communication device 22b, at step 210, the IP-SCP 32 sends routing and recording instructions in an Analyze_Route message to the PSX 24. In response, the PSX 24 maps information contained in the Analyze_Route message to a Response message, which is sent to the GSX 26. Upon receiving the Response message, the GSX 26 generates a third INVITE message with a "To" header containing the destination address it received from the Response message. Thereafter, the GSX 26 sends the third INVITE message to the called party at the second communication device 22b, with NULL SDP. In the exemplary embodiment, the third INVITE message can include the following information: a "To" field containing the IP address of the called party, a "From" field containing the IP address of the GSX 26 and NULL SDP.

Since the GSX 26 maintains the call state, the GSX 26 inserts a Record-Route header into the third INVITE message to ensure that all subsequent messages by either party are sent via the GSX 26. Based on the billing information received, the GSX 26 also generates a Start Call Detail Record (CDR), which is associated with the call. In response to receipt of the third INVITE message, the called party at the second communication device 22b sends a 183 Session Progress message to the GSX 26 with SDP information associated with the second communication device 22b. Upon receiving the 183 Session Progress message, the GSX 26 sends a Re-INVITE message to the caller operating at the first communication device 22a with the SDP information that the GSX 26 received from the second communication device 22b. The first communication device 22a acknowledges the Re-INVITE message with a 200 OK message with its SDP information, which is communicated to the GSX 26. Upon receiving the 200 OK message at the GSX 26, the GSX 26 sends another PRACK message to the second communication device 22b. Thereafter, the second communication device 22b returns an ACK message to the calling party at the first communication device 22a, via the GSX 26. At this point, the first communication device 22a (e.g., calling device) and the second communication device 22b (e.g., called device) communicate with each other for resource reservation using Resource Reservation Protocol-Traffic Engineering (RSVP-TE). Thereafter, a direct multi-media path is formed between the calling party at the first communication device 22a and the called party at the second communication device 22b.

At step 220, either the calling party at the first communication device 22a or the called party at the second communication device 22b can elect to disconnect the multi-media session. If an election is made by either the calling party at the first communication device 22a or the called party at the second communication device 22b to disconnect, then at step 230, the GSX 26 disconnects the previously formed multi-media session between the calling party at the first communication device 22a and the called party at the second communication device 22b and the method ends at step 240.

At step 250, after the customer logic at the IP-SCP 32 determines in step 200 that the caller-entered data is invalid, which data was collected above in connection with step 190, the caller at the first communication device 22a should be re-prompted for additional digits. At step 260, in order to re-prompt the caller at the first communication device for caller-entered data, the IP-SCP 32 sends a Call_Info_To_Resource message to the PSX 24 with the instructions to re-play an announcement and collect digits. In this exemplary embodiment, the Call_Info_To_Resource message can include the following information:

Package Type=Conversation with Permission to Release
        Component Type=Invoke(Last)
        Operation=CallInfoToResource
        Parameters
            ResourceType=FlexParameterBlock
            StrParameter Block=FlexParameterBlock
            IPResourceType=PlayAnnouncements & CollectDigits
            IPStrParameterBlock=AnnouncementDigitBlock Specifications on the Call_Info_To_Resource message information can be obtained at Telcordia GR-1129-CORE, AINGR: Switch Service Control Point (SCP)/Adjunct interface—[November 2000], the subject matter of which is herein incorporated by reference.

Upon receipt of the Call_Info_To_Resource message, the PSX 24 maps the information to a Response message and sends the Response message to the GSX 26. After receiving the Response message from the PSX 24, the GSX 26 maps the information contained therein to a Re-INVITE message and sends the Re-INVITE message to the MS 30. In an embodiment, GR-1129 AIN message set information is encapsulated into a body portion of the Re-INVITE message, which information was initially received at the GSX 26 in the Response message. Upon receipt of the Re-INVITE message, the MS 30 plays the appropriate announcements and again collects the caller-entered data. Upon completion of the caller interaction, the MS 30 copies the caller-entered data into a body portion of an INFO message and sends the INFO message to the GSX 26. Upon receiving the INFO message, the GSX 26 maps the information from the INFO message to a Query message, which is sent to the PSX 24. The PSX 24 maps the information from the Query message to a Resource_Clear message in the TCAP format, which is sent to the IP-SCP 32 in response to the Call_info_To_Resource message provided to the PSX 24 by the IP-SCP 32. In the exemplary embodiment, the Resource_Clear message can include the following information:

Package Type=Conversation with Permission to Release
        Component Type=Invoke(Last)
        Operation=ResourceClear
        Parameters
          IP Return Block
          AnnouncementDigitResults
          IPCollectedDigits
          ClearCause=normal Specifications on the Resource_Clear message information can be obtained at Telcordia GR-1129-CORE, AINGR: Switch Service Control Point (SCP)/Adjunct interface—[November 2000], the subject matter of which is herein incorporated by reference.

Upon receipt of the Resource_Clear message, with Clear Cause=Normal, the method returns again to step 200 and the IP-SCP 32 validates the digits. If the digits are valid, the above-described steps 210 through 240 may be executed. On the other hand, if the digits are invalid (e.g., due to an invalid authorization code, invalid dialed number, no code entered, or number screening), the method can be accelerated to steps 270 and 280 for which the IP-SCP 32 sends instructions to play a terminating announcement in a Send_To_Resource message. In this exemplary embodiment, the Send_To_Resource message can include the following information:

ResourceType=FlexParameterBlock
    StrParameter Block=FlexParameterBlock
    IPResourceType=PlayAnnouncements
    PStrParameterBlock=AnnouncementDigitBlock
    Destination Address=MS IP address Specifications on the Send_To_Resource message information can be obtained at Telcordia GR-1129-CORE, AINGR: Switch Service Control Point (SCP)/Adjunct interface—[November 2000], the subject matter of which is herein incorporated by reference.

Upon receipt of the Send_To_Resource message, the PSX 24 maps the contents of the message to a Response message, which is sent to the GSX 26. The GSX 26 maps the contents of the Response message to a Re-INVITE message and sends the Re-INVITE message to the MS 30. In an embodiment, GR-1129 AIN message set information is encapsulated into a body portion of the Re-INVITE message, which information was initially received at the GSX 26 in the Response message. The MS 30 executes the instructions received in the Re-INVITE message and plays the terminating announcement to the caller at the first communication device 22a. At step 290, after playing the termination announcement, the MS 30 disconnects the call leg formed between the MS 30 and the GSX 26 by sending a "BYE" message to the GSX 26. Upon receiving the BYE message from the MS 30, the GSX 26 maps information from the BYE message to a Query message, which is sent to the PSX 24. In response to the BYE message received at the PSX 24, the PSX 24 provides a Resource_Clear message to the IP-SCP containing a ClearCause parameter.

Upon receipt of the Resource_Clear message, the IP-SCP 32 terminates the call by initiating a Disconnect message with Operation=Disconnect, which is provided to the PSX 24. Upon receiving the Disconnect message from the IP-SCP 32, the PSX 24 maps information from the Disconnect message to a Response message, which is sent to the GSX 26. After receiving the Response message, the GSX 26 initiates a "BYE" to the caller at the first communication device 22a to disconnect the call leg formed between the PSX 24 and the first communication device 22a. Thereafter, the method 100 ends at step 240.

In another exemplary embodiment, the multi-media provider system 10a can be employed to carry out the formation of multi-media communications between at least the first 22a and second 22b communication devices without requiring an initiating party or caller to provide user-entered data to the MS 30. In this exemplary embodiment the general call flow requires a plurality of messages to be translated back and forth between SIP and TCAP formats, as well as the use of Third Party Call Control (TPCC) by the GSX 26 for connecting the first 22a and second 22b communication devices.

More specifically at step 160, if the IP-SCP determines that resources of the MS 30 are not required to form the multi-media communication path between the first 22a and second 22b communication devices (e.g., user interaction is not required), the method is accelerated to step 210, for which the IP-SCP 32 executes a process for forming the multi-media communication path between the first 22a and second 22b communication devices. In this exemplary embodiment, the process executed by the IP-SCP 32 includes returning an Analyze_Route message to the PSX 24 with routing and recording instructions. In this embodiment, the Analyze_Route message can include the following information:

Package Type=Conversation with Permission to Release
        Component Type=Invoke(Last)
          Operation=AnalyzeRoute
          Parameters
            ChargeNumber
            CallingPartyID CalledPartyID
Carrier
CollectedAddressInfo
AMAsIpID
Component Type=Invoke(last)
Operation=Furnish_AMA Specifications on the Analyze_Route message information can be obtained at Telcordia GR-1129-CORE, AINGR: Switch Service Control Point (SCP)/Adjunct interface—[November 2000], the subject matter of which is herein incorporated by reference.

Upon receiving the Analyze_Route message from the IP-SCP 32, the PSX 24 maps the information from the Analyze_Route message to a Response message, which is sent to the GSX 26. After receiving the Response message at the GSX 26, the GSX 26 generates a second INVITE message based on the called party's IP address, which was previously received in the Response message received from the PSX 24. Thereafter, the GSX 26 sends the second INVITE message to the called party at the second communication device 22b. In the exemplary embodiment, the second INVITE message body can include a "To" field containing the IP address of the called party, a "From" field containing the IP address of the PSX 24 and SDP of the first INVITE message mapped to the SDP of the second INVITE message. The second INVITE message can further include a Record Route header, which is inserted into the second INVITE message by the GSX 26 to permit the GSX 26 to maintain call state information. The GSX 26 further creates a Call Detail Record for this call.

The called party at the second communication device 22b receives the second INVITE message from the GSX 26 and responds by returning a 183 Session Progress message to the GSX 26, which includes SDP information of the second communication device 22b. Upon receiving the 183 Session Progress message, the GSX 26 sends a 183 Session Progress message to the caller at the first communication device 22a with the SDP information it received from the called party at the second communication device 22b. The first communication device 22a acknowledges the 183 Session Progress message with a PRACK message that is provided to the GSX 26. Upon receiving the PRACK message at the GSX 26, the GSX 26 sends a PRACK message to the second communication device 22b. The called party at the second communication device 22b returns a 200 OK message, via the GSX 26, to the calling party at the first communication device 22a.

At this point, the calling party at the first communication device 22a and the called party at the second communication device 22b communicate with each other for resource reservation using RSVP-TE. After resource reservation, the calling party sends a COMET message to the called party confirming success. Upon receipt of the COMET message, the called party sends a 200 OK to the calling party, via the GSX 26, in response to the COMET message. Further, the called party sends a 180 Ringing message to the calling party, via the GSX 26. In response to the 180 Ringing message, the calling party sends a PRACK message to the called party, via the PSX 26. In response to the PRACK message, the called party sends a 200 OK message to the calling party, via the GSX 26. The called party at the second communication device 22b may now send a 200 OK message in response to receipt of the second INVITE message, which was provided to the second communication device 22b by the GSX 26, as described above.

In response to the second INVITE message received by the called party at the second communication device 22b, the second communication device 22b provides a 200 OK message to the GSX 26. At this point, the GSX 26 responds to receipt of the first INVITE message by sending a 200 OK message to the calling party at the first communication device 22a.

The calling party at the first communication device 22a thereafter sends an ACK message to the called party at the second communication device 22b. At this instant, there is a call leg formed between the calling party at the first communication device 22a and the GSX 26, and a call leg formed between the GSX 26 and the called party at the second communication device 22b. Furthermore, a media session is formed directly between the calling party at the first communication device 22a and the called party at the second communication device 22b, which by-passes the GSX. In addition, either the calling party at the first communication device 22a or the called party at the second communication 22b can elect to disconnect the multi-media communication path, in a similar manner to that described above with respect to steps 220 and 230.

While various features of the present invention are described herein in conjunction with exemplary embodiments having various components using a number of protocols, it should be understood that other suitable components and protocols can be used without departing from the present invention.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto. All references and publications cited herein are expressly incorporated herein by reference in their entirety.

What is claimed is:

1. A method of processing a request message, comprising:
    receiving the request message in a first format for a multi-media service at a processor of a gateway controller and translating the request message in the first format into a request message in a second format;
    forwarding, by the processor, the request message in the second format to a switching device for translating the request message in the second format into a request message in a third format;
    receiving a media server instruction message in the second format at the processor of the gateway controller, wherein the gateway controller is operative for mapping interactive voice response message set information from the media server instruction message in the second format into a media server instruction message in the first format; and
    forwarding, by the processor, the media server instruction message in the first format including the interactive voice response message set information to a media server for forming a multi-media communication path with a communication device.

2. The method of claim 1, further comprising:
    playing a predetermined announcement to the communication device over the multi-media communication path.

3. The method of claim 2, further comprising:
    receiving caller-entered data at the media server in response to the predetermined announcement.

4. The method of claim 3, further comprising:
    processing the caller-entered data at the media server to generate a validation message in the first format and including the caller-entered data.

5. The method of claim 4, further comprising:
receiving and processing the validation message in the first format at the gateway controller to generate a validation message in the second format and including the caller-entered data.

6. The method of claim 5, further comprising:
sending the validation message in the second format to the switching device for generating a validation message in the third format and including the caller-entered data.

7. The method of claim 6, further comprising:
sending the validation message in the third format by the switching device to a processor for validating the caller-entered data.

8. The method of claim 7, further comprising:
declaring the caller-entered data as valid and connect; and
controlling the gateway controller to form a multi-media communication path between the communication device and one other communication device.

9. The method of claim 8, wherein controlling the gateway controller, comprises:
executing a predetermined conference call protocol at the gateway controller to form the multi-media communication path between the communication device and the one other communication device.

10. The method of claim 9, wherein executing the predetermined conference call protocol at the gateway controller includes executing a third party call control protocol.

11. The method of claim 7, further comprising:
declaring the caller-entered data as invalid and re-prompt; and
controlling the media server to re-play the predetermined announcement to the communication device over the multi-media communication path.

12. The method of claim 11, further comprising:
receiving caller-entered data at the media server in the response to the replay of the predetermined announcement to the communication device; and
repeating the processing the caller-entered data at the media server to generate the validation message in the first format and including the caller-entered data.

13. The method of claim 7, further comprising:
declaring the caller-entered data as invalid and disconnect;
controlling the media server to play a termination announcement to the communication device over the multi-media communication path; and
disconnecting the multi-media communication path formed between the media server and the communication device.

14. The method of claim 1, wherein translating the request message in the first format into the request message in the second format includes translating the request message from a session initiation protocol invite format to a diameter-plus format.

15. The method of claim 1, wherein translating the request message in the second format into the request message in the third format includes translating the request message from a diameter-plus format to an advanced-intelligent-network transactions capabilities format.

16. The method of claim 1, wherein the media server instruction message is in an artificial-intelligence-network transactions capabilities format.

17. The method of claim 1, wherein prior to the receiving the request message in the first format, further comprises:
receiving the request message in the first format at the switching device; and
re-directing the request message in the first format for the multi-media service to the gateway controller.

18. The method of claim 1, wherein the gateway controller is further operative to construct a multipurpose internet mail extensions GR-1129 media type in a message body portion of the media server instruction message in the first format.

19. The method of claim 1, wherein the interactive voice response message set information includes GR-1129 advanced intelligent network message set information.

20. A gateway controller for processing a request message, comprising:
a processor; and
a computer-readable medium storing a plurality of instructions which, when executed by the processor, cause the processor to perform operations, the operations comprising:
receiving the request message in a first format for a multi-media service and translating the request message in the first format into a request message in a second format;
forwarding the request message in the second format to a switching device for translating the request message in the second format into a request message in a third format;
receiving a media server instruction message in the second format, and mapping interactive voice response message set information from the media server instruction message in the second format into a media server instruction message in the first format; and
forwarding the media server instruction message in the first format including the interactive voice response message set information to a media server for forming a multi-media communication path with a communication device.

* * * * *